United States Patent
Choi et al.

(10) Patent No.: US 9,057,854 B2
(45) Date of Patent: Jun. 16, 2015

(54) OPTICAL PRINTED CIRCUIT BOARD AND METHOD OF MANUFACTURING THE SAME

(75) Inventors: Jae Bong Choi, Seoul (KR); Joon Wook Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 270 days.

(21) Appl. No.: 13/060,313

(22) PCT Filed: Nov. 5, 2009

(86) PCT No.: PCT/KR2009/006490
§ 371 (c)(1),
(2), (4) Date: Feb. 23, 2011

(87) PCT Pub. No.: WO2011/055868
PCT Pub. Date: May 12, 2011

(65) Prior Publication Data
US 2011/0216999 A1   Sep. 8, 2011

(51) Int. Cl.
*G02B 6/12* (2006.01)
*G02B 6/43* (2006.01)
*G02B 6/36* (2006.01)
*G02B 6/42* (2006.01)

(52) U.S. Cl.
CPC ............... *G02B 6/43* (2013.01); *G02B 6/3608* (2013.01); *G02B 6/3644* (2013.01); *G02B 6/4214* (2013.01)

(58) Field of Classification Search
CPC ........................... G02B 6/3608; G02B 6/3644
See application file for complete search history.

(56) References Cited

U.S. PATENT DOCUMENTS

| | | | | |
|---|---|---|---|---|
| 3,967,877 A * | 7/1976 | Heidrich et al. | ........... | 385/49 |
| 5,392,368 A * | 2/1995 | Schiltz | ............ | 385/14 |
| 6,137,930 A * | 10/2000 | Laughlin | ........ | 385/34 |
| 6,527,456 B1 * | 3/2003 | Trezza | ............. | 385/89 |
| 6,623,177 B1 * | 9/2003 | Chilton | ............ | 385/88 |
| 7,136,551 B2 | 11/2006 | Cho et al. | | |
| 7,389,013 B2 * | 6/2008 | Fang et al. | ........ | 385/14 |
| 2007/0025079 A1 | 2/2007 | Salmon | | |
| 2010/0232741 A1 | 9/2010 | Kim et al. | | |

FOREIGN PATENT DOCUMENTS

| | | |
|---|---|---|
| JP | 02-087107 A | 3/1990 |
| JP | 04-152587 A | 5/1992 |
| KR | 10-2004-0079385 A | 9/2004 |
| KR | 10-2006-0017053 A | 2/2006 |
| KR | 10-2009-0092204 | 8/2009 |
| WO | WO-2009/041771 A2 | 2/2009 |

OTHER PUBLICATIONS

Office Action dated May 23, 2011 in Korean Application No. 10-2008-0067163, filed Jul. 10, 2008.

(Continued)

*Primary Examiner* — Uyen Chau N Le
*Assistant Examiner* — Chris Chu
(74) *Attorney, Agent, or Firm* — Saliwanchik, Lloyd & Eisenschenk

(57) ABSTRACT

An optical printed circuit board is provided. The optical printed circuit board includes an insulation member, an optical fiber disposed in the insulation member and having opposite end portions exposed to a side of the insulation member, and at least one supporting member provided with a guide portion coupled to the opposite end portions of the optical fiber and guiding bending of the optical fiber.

10 Claims, 3 Drawing Sheets

(56) References Cited

OTHER PUBLICATIONS

Notice of Allowance dated Dec. 20, 2011 in Korean Application No. 10-2008-0067163, filed Jul. 10, 2008.
Office Action dated Jan. 6, 2014 in Chinese Application No. 2009801326975.
Office Action dated Dec. 10, 2013 in Japanese Application No. 2012536643.
Office Action dated Nov. 22, 2013 in Korean Application No. 10-2012-7014649.

* cited by examiner

Figure 1
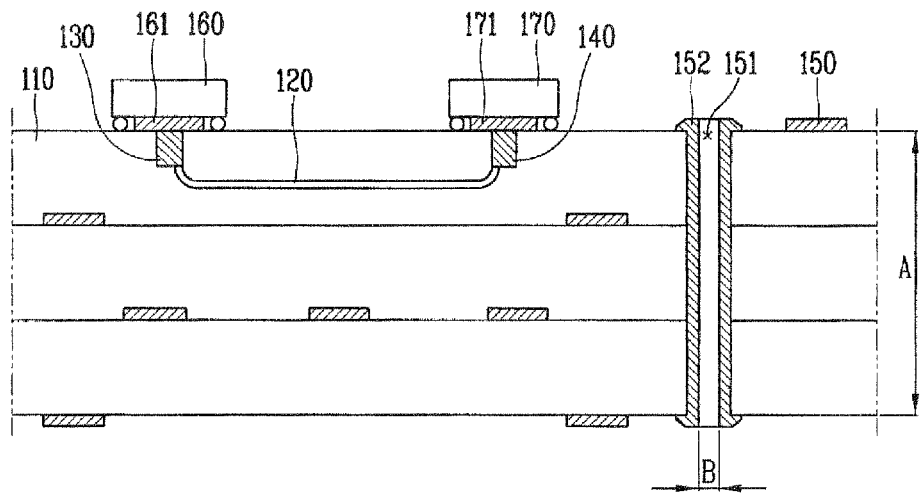
Figure 2
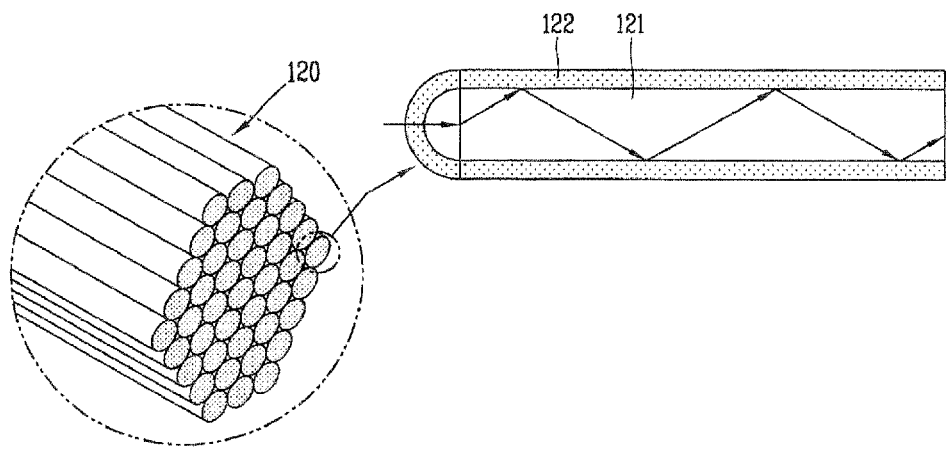
Figure 3

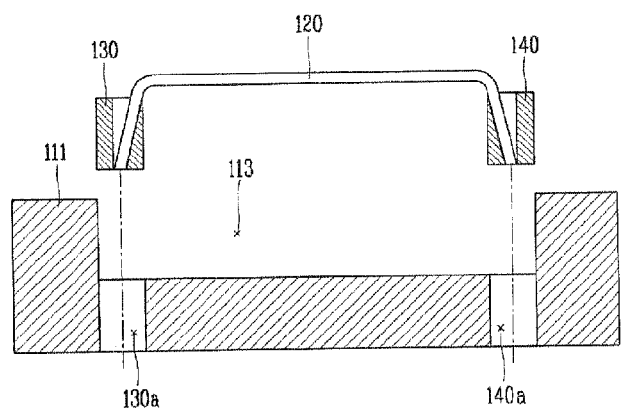
[Figure 7]
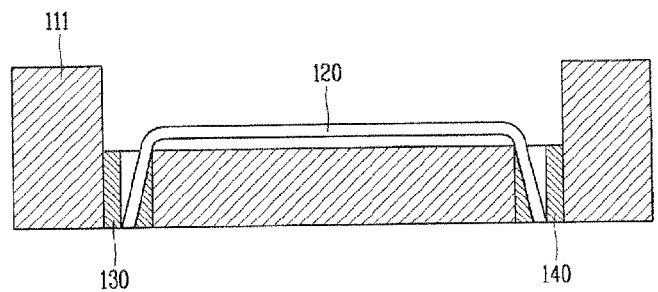
[Figure 8]
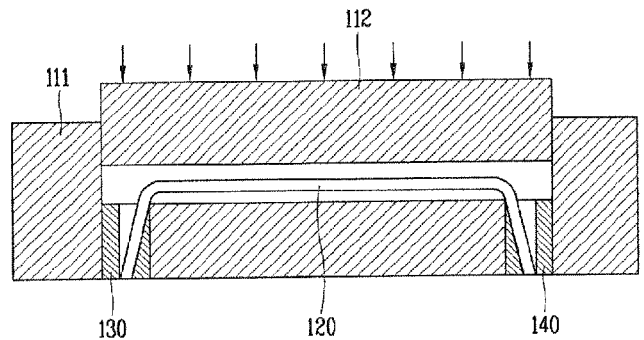
[Figure 9]
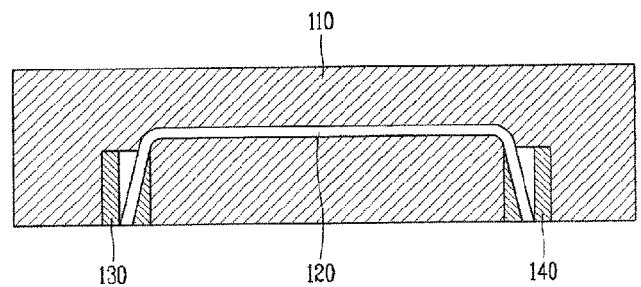

OPTICAL PRINTED CIRCUIT BOARD AND METHOD OF MANUFACTURING THE SAME

CROSS-REFERENCE TO RELATED APPLICATION

This application is the U.S. national stage application of International Patent Application No. PCT/KR2009/006490, filed Nov. 5, 2009, the disclosure of which is hereby incorporated by reference in its entirety.

TECHNICAL FIELD

Embodiments relates to an optical printed circuit board adopting optical fiber and a method of manufacturing the optical printed circuit board.

BACKGROUND ART

A printed circuit board is an electronic component that enables a variety of devices to be mounted thereon or the devices to be electrically interconnected by integrating metal lines therein. As technology has advanced, printed circuit boards having various functions and forms have been manufactured.

Due to fast information technology progress, the propagation velocity of the signal has been regarded as an important parameter in electronic appliances such as portable terminals, laptop computers, etc. Since the printed circuit board that is formed by forming a circuit pattern on a copper clad laminate uses electric lines as signal propagation media and the electric lines are mainly formed of conductive metal such as copper and the like, there is a limitation in propagating a tremendous amount of data.

Recently, an optical printed circuit board technology in which an optical waveguide is formed on an insulation member has been developed. In order to realize the optical waveguide through which light passes in the optical printed circuit board, optical fiber using polymer and glass fiber has been used.

DISCLOSURE

Technical Problem

Embodiments provide an optical printed circuit board having an inventive structure and a method of manufacturing the printed circuit board.

Embodiments also provide an optical printed circuit board that is slim and a method of manufacturing the printed circuit board.

Embodiments also provide an optical printed circuit board that can be manufactured through a simple process and a method of manufacturing the printed circuit board.

Technical Solution

In one embodiment, an optical printed circuit board includes: an insulation member; an optical fiber disposed in the insulation member and having opposite end portions exposed to a side of the insulation member; and at least one supporting member provided with a guide portion coupled to the opposite end portions of the optical fiber and guiding bending of the optical fiber.

In another embodiment, a method of manufacturing an optical printed circuit board, the method including: forming an optical fiber disposing region on a first insulation member; mounting the optical fiber and first and second supporting member coupled to opposite ends of the optical fiber in the optical fiber disposing region; and covering the optical fiber disposing region with a second insulation member.

The details of one or more embodiments are set forth in the accompanying drawings and the description below. Other features will be apparent from the description and drawings, and from the claims.

Advantageous Effects

The embodiments provide an optical printed circuit board having an inventive structure and a method of manufacturing the printed circuit board.

The embodiments also provide an optical printed circuit board that is slim and a method of manufacturing the printed circuit board.

The embodiments also provide an optical printed circuit board that can be manufactured through a simple process and a method of manufacturing the printed circuit board.

DESCRIPTION OF DRAWINGS

FIG. 1 is a cross-sectional view of an optical printed circuit board according to an embodiment.

FIG. 2 is a view illustrating an optical fiber of FIG. 1.

FIG. 3 is a perspective view of a first supporting member of FIG. 1.

FIGS. 5 to 9 are views illustrating a method of manufacturing an optical printed circuit board according to an embodiment.

MODE FOR INVENTION

Figure 4:
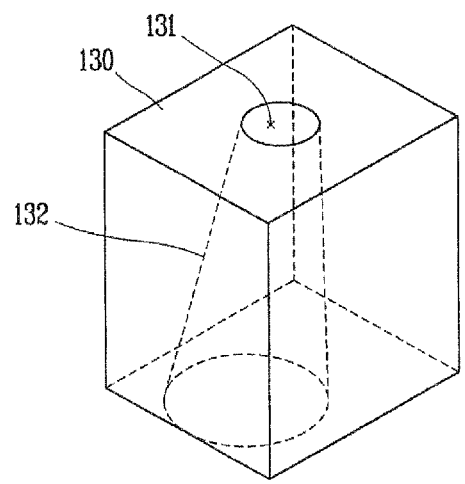
FIG. 4 is a cross-sectional view of first and second supporting members on which optical fibers are mounted.

In the following description, it will be understood that when a layer (or film) is referred to as being 'on' another layer or substrate, it can be directly on the another layer or substrate, or intervening layers may also be present. Further, it will be understood that when a layer is referred to as being 'under' another layer, it can be directly under the another layer, and one or more intervening layers may also be present. In addition, it will also be understood that when a layer is referred to as being 'between' two layers, it can be the only layer between the two layers, or one or more intervening layers may also be present.

In the figures, the dimensions of layers and regions are exaggerated for clarity of illustration. Like reference numerals refer to like elements throughout.

Reference will now be made in detail to the embodiments of the present disclosure, examples of which are illustrated in the accompanying drawings.

FIG. 1 is a cross-sectional view of an optical printed circuit board according to an embodiment.

Referring to FIG. 1 includes an insulation member 110, optical fiber 120 disposed in the insulation member 110, and first and second supporting members 130 and 140 supporting opposite end portions of the optical fiber 120.

The insulation member 110 may be formed of epoxy resin or phenol resin containing a glass fiber. The optical fiber 120 may be formed on the insulation member 110. A circuit pattern 150 formed of conductive metal (e.g., Copper) may be also formed on the insulation member 110. The insulation member 110 may be formed with a plurality of layers each having a circuit pattern 150.

In addition, the insulation member 110 is provided with viaholes 151 for electric connection between the circuit patterns 150 formed on different layers. Conductive metal is coated on inner surfaces of the viaholes 151.

The optical fiber 120 is a thin fiber for transmitting an optical signal. The optical fiber 120 has a diameter of 0.02~0.05 µm. A bundle of the optical fibers 120 may be disposed in the insulation member 110.

FIG. 2 is a view illustrating the optical fiber of FIG. 1.

A bundle of the optical fibers 120 is disposed in the insulation member 110. However, in other drawings except for FIG. 2, only one optical fiber 120 is depicted for the descriptive convenience.

Each of the optical fibers 120 includes a core 121 that is a medium for propagating light and a cladding 122 for preventing radio interference that the signal leaks from the core 121 of one optical fiber 120 to the core 121 of another optical fiber 120. The core 121 may be formed of quartz-based glass, silica-based glass, or polymer compound. The cladding 122 has a lower refractive index than the core 121 and is coated on an outer circumferential surface of the core 121. A protective layer for protecting the cladding 122 from external impact may be additional coated on an outer circumferential surface of the cladding 122.

As shown in FIG. 2, the light incident on a first end of the optical fiber 120 is continuously total-reflected on a boundary portion between the core 121 and the cladding 122 and propagated to a second end of the optical fiber 120.

The first and second supporting members 130 and 140 support the opposite end portions of the optical fiber 120 such that the end portions of the optical fiber 120 are disposed on a surface of the insulation member 110.

The first and second supporting members 130 and 140 may be disposed in first and second mounting grooves 130a and 140a (see FIG. 6) formed on the insulation member 110. The first and second members 130 and 140 may be disposed such that a top surface thereof is on a same plane as the surface of the insulation member 110.

The optical fiber 120 may be disposed in parallel with a principal surface of the insulation member 110 and buried in the insulation member 110. The optical fiber 120 is bent at its opposite end portions at a predetermined angle.

A transmitter module 160 for inputting the optical signal to the optical fiber 120 is disposed above the first supporting member 130. A vertical-cavity surface-emitting laser (VCSEL) 161 that is a light source emitting the optical signal is installed on the transmitter module 160. The VCSEL 161 is a light source that transmits the optical signal in a way where laser beams are emitted to the optical fiber 120.

A receiving module 170 for receiving the optical signal passing through the optical fiber 120 is installed above the second supporting member 140. The receiving module 170 functions to covert the optical signal transmitted from the optical fiber 120 into an electric signal. A photo detector 171 that is a device for detecting the optical signal is mounted on the receiving module 170.

The optical signal from the VCSEL 161 of the transmitter module 160 passes through the optical fiber 120 and reaches the photo detector 171 of the receiving module 170. The optical signal is total-reflected and passes through the optical fiber 120. Here, the opposite end portions of the optical fiber 120 are bent to be exposed on the top surface of the insulation member 110. However, the optical fiber 120 is bent to realize the total-reflection by the first and second supporting members 130 and 140.

FIG. 3 is a perspective view of a first supporting member of FIG. 1 and FIG. 4 is a cross-sectional view of first and second supporting members on which optical fibers are mounted.

Referring to FIG. 3, the first supporting member 130 is shaped to correspond to the mounting groove 130a of the first supporting member 130. As shown in FIG. 3, the first supporting member 130 may be formed in a rectangular parallelepiped.

The first supporting member 130 includes a guide portion for guiding the bending of the optical fiber 120 within a range in which the optical signal is totally reflected. The guide portion may be provided in the form of a guide hole 131 formed through the first supporting member 130.

The guide hole 131 is provided with an inclined surface 132 that is inclined with respect to the principal surface of the insulation member 110 at a predetermined angle. In this embodiment, the guide hole 131 is formed in a cone shape in which the upper portion has a smaller area than the lower portion. However, the present invention is not limited to this. That is, the guide hole 131 may be formed in a cylindrical shape in which the upper portion has a same area as the lower portion.

In addition, the second supporting member 140 may be formed in a same structure as the first supporting member 130. Therefore, the description of the second member 140 will quote the above-description of the first supporting member 130.

Referring to FIG. 4, the optical fibers 120 are provided in the form of a bundle and inserted into the guide holes 131 and 141. The opposite end portions of the bundle of the optical fibers 120 may be disposed on the substantially same plane as the top surface of the first and second supporting members 130 and 140.

The first and second members 130 and 140 are mounted on the insulation member 110 such that the bundle of the optical fibers 120 can be located in the insulation member 110.

In the optical printed circuit board of this embodiment, since the optical fibers 120 are installed by the first and second supporting members 130 and 140, the installation of the bundle of the optical fibers 120 can be easily realized through a simple process.

According to the optical printed circuit board of this embodiment, since the bundle of the optical fibers 120 is bent toward the transmitter and receiving modules 160 and 170 by the first and second supporting members 130 and 140 within a range in which the total-reflection is possibly realized, the optical signal can be stably transmitted through the optical fibers 120.

According to this embodiment, since the bundle of the optical fibers 120 is fixedly buried in the insulation member 110, no structure for fixing the bundle of the optical fibers 120 is required. Therefore, the optical printed circuit board that is slimmer can be realized. That is, a thickness A of the insulation member of FIG. 1 can be reduced.

Generally, when plating the viahole 151, ratio of a diameter of the viahole 151 to a thickness A of the insulation member 110, i.e., a value (B/A) must be greater than a predetermined reference value. The value (B/A) is determined by a chemical material or apparatus used for the plating the viahole 151.

Therefore, when the thickness A of the insulation member 110 is reduced, the diameter B of the viahole 151 can be also reduced and thus a degree of integration of the circuit pattern or electronic devices that are disposed on a top or under surface of the insulation member 110 can be increased. As a result, a degree of freedom in designing the circuit can be increased.

The following will describe a method of manufacturing an optical printed circuit board according to an embodiment.

FIGS. 5 to 9 are views illustrating a method of manufacturing the optical printed circuit board according to an embodiment.

Figure 5:
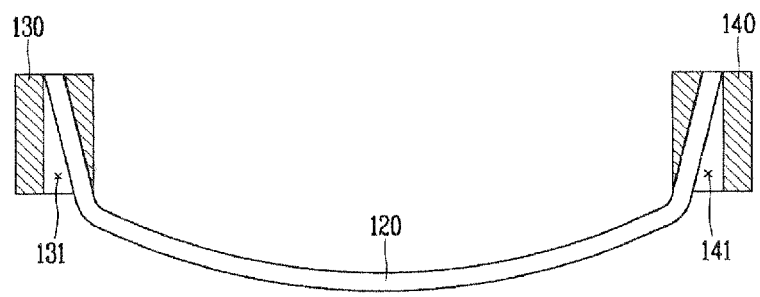

Referring first to FIG. 5, an optical fiber disposing region 113 is formed on a first insulation member 111. The optical fiber disposing region 113 may be formed by selectively etching the first insulation member 111 formed in a flat plate type.

Figure 6:
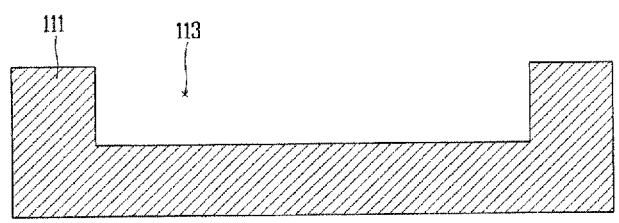

Referring to FIG. 6, the mounting groove 130a and 14a for mounting the first and second supporting members 130 and 140 are formed in the optical fiber disposing region 113. The mounting grooves 130a and 140a may be formed through a photolithography process, an etching process, or a drilling process.

Referring to FIG. 7, the first and second supporting member 130 and 140 that are coupled to the optical fiber 120 are mounted in the first and second mounting grooves 130a and 140a. Here, the opposite end portions of the optical fiber 120 keeps their bending state by the guide holes 131 and 141 of the first and second supporting members 130 and 140.

Referring to FIG. 8, the optical fiber disposing region 113 is covered by a second insulation member 112. The second insulation member 112 is stacked on the first insulation member 111 through a pressing process. As heat and pressure are applied, the first and second insulation members 111 and 112 are molten to have adhesion and the optical fiber 120 naturally keeps its bending state due to the flow of the second insulation member 112 that is in a high temperature state.

As the first and second insulation members 111 and 112 are cooled and hardened, the second insulation member 112 is securely adhered to the first insulation member 111. Here, the first and second insulation member 111 and 112 are integrated with each other to form the insulation member 110 that is described above with reference to FIG. 1. The optical fiber 120 is fixed between the first and second insulation members 111 and 112 in the course of cooling and hardening the first and second insulation members 111 and 112.

After the optically fiber 120 is buried in the insulation member 110 as described above, a process for forming the circuit pattern 150, a process for stacking other insulation member, a process for mounting the transmitter and receiving modules 160 and 170, and a process for forming the viahole 151, etc are additionally performed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The embodiments can be applied to an optical printed circuit board field and a method of manufacturing the optical printed circuit board.

The invention claimed is:

1. An optical printed circuit board comprising;
an insulation member;
an optical fiber disposed in the insulation member and having opposite end portions extended to a principal surface of the insulation member; and
at least one supporting member provided with a guide portion coupled to the opposite end portions of the optical fiber and guiding bending of the optical fiber;
wherein the guide portion comprises a guide hole formed through the supporting member;
wherein the guide hole comprises a first opening formed through a first surface of the supporting member, a second opening formed through a second surface of the supporting member opposite to the first surface, and an inner surface between the first opening and the second opening;
wherein the first opening is closer to the principal surface of the insulation member than the second opening is;
wherein the first opening has a smaller area than the second opening does;
wherein the first and second surfaces of the supporting member, through which the first and second openings are formed, respectively, are both parallel to the principal surface of the insulation member;
wherein the optical fiber is slanted in the at least one supporting member such that a center of the optical fiber disposed at the first opening is not aligned, in a vertical direction perpendicular to the principal surface of the insulation member, with a center of the optical fiber disposed at the second opening;
wherein a first inner portion of the inner surface of the guide hole is perpendicular to the principal surface of the insulation member and a second inner portion of the inner surface of the guide hole is slanted with respect to the principal surface of the insulation member;
wherein the optical fiber comprises a first portion inserted in the guide hole of the supporting member and a second portion buried in the insulation member;
wherein an entire surface of a first side surface of the first portion of the optical fiber is in direct physical contact with the second inner portion of the inner surface of the guide hole, and
wherein a second side surface of the first portion of the optical fiber is distanced from the first inner portion of the inner surface of the guide hole.

2. The optical printed circuit board according to claim 1, wherein the guide hole is inclined with respect to the principal surface of the insulation member.

3. The optical printed circuit board according to claim 1, wherein the insulation member comprises a first insulation member and a second insulation member that is fusion-joined to the first insulation member and the optical fiber.

4. The optical printed circuit board according to claim 1, wherein the supporting member comprises a first supporting member and a second supporting member that are spaced apart from each other and exposed to the principal surface of the insulation member.

5. The optical printed circuit board according to claim 4, wherein the opposite end portions of the optical fiber are exposed to the principal surface of the insulation member through the first and second supporting members.

6. The optical printed circuit board according to claim 4, further comprising a transmitter module disposed opposite to the optical fiber exposed to the principal surface through the first supporting member and a receiving module disposed opposite to the optical fiber exposed to the principal surface through the second supporting member.

7. A method of manufacturing an optical printed circuit board, the method comprising:
   forming an optical fiber disposing region on a first insulation member;
   forming mounting holes for mounting first and second supporting members in the optical fiber disposing region;
   mounting the optical fiber and the first and second supporting members coupled to opposite ends of the optical fiber in the optical fiber disposing region; and
   covering the optical fiber disposing region with a second insulation member;
   wherein the first insulation member comprises a principal surface through which the ends of the optical fiber are exposed;
   wherein the first supporting member is provided with a first guide portion guiding bending of the optical fiber and the second supporting member is provided with a second guide portion guiding bending of the optical fiber;
   wherein the first guide portion comprises a first guide hole formed through the first supporting member and the second guide portion comprises a second guide hole formed through the second supporting member;
   wherein the first guide hole comprises a first opening formed through a first surface of the first supporting member, a second opening formed through a second surface of the first supporting member opposite to the first surface of the first supporting member, and a first inner surface between the first opening and the second opening;
   wherein the second guide hole comprises a third opening formed through a first surface of the second supporting member, a fourth opening formed through a second surface of the second supporting member opposite to the first surface of the second supporting member, and a second inner surface between the third opening and the fourth opening;
   wherein the first opening is closer to the principal surface of the insulation member than the second opening is, and the third opening is closer to the principal surface of the insulation member than the fourth opening is;
   wherein the first opening has a smaller area than the second opening does, and the third opening has a smaller area than the fourth opening does;
   wherein the first and second surfaces of the first supporting member, through which the first and second openings are formed, respectively, are both parallel to the principal surface of the insulation member;
   wherein the first and second surfaces of the second supporting member, through which the third and fourth openings are formed, respectively, are both parallel to the principal surface of the insulation member;
   wherein the optical fiber is slanted in the at least one supporting member such that a center of the optical fiber disposed at the first opening is not aligned, in a vertical direction perpendicular to the principal surface of the insulation member, with a center of the optical fiber disposed at the second opening;
   wherein a first inner portion of the first inner surface of the first guide hole is perpendicular to the principal surface of the insulation member and a second inner portion of the first inner surface of the first guide hole is slanted with respect to the principal surface of the insulation member;
   wherein a first inner portion of the second inner surface of the second guide hole is perpendicular to the principal surface of the insulation member and a second inner portion of the second inner surface of the second guide hole is slanted with respect to the principal surface of the insulation member;
   wherein the optical fiber comprises a first portion inserted in the first guide hole, a second portion buried in the second insulation member, and a third portion inserted in the second guide hole;
   wherein an entire surface of a first side surface of the first portion of the optical fiber is in direct physical contact with the second inner portion of the inner surface of the first guide hole;
   wherein a second side surface of the first portion of the optical fiber is distanced from the first inner portion of the inner surface of the first guide hole;
   wherein an entire surface of a first side surface of the third portion of the optical fiber is in direct physical contact with the second inner portion of the inner surface of the second guide hole, and
   wherein a second side surface of the third portion of the optical fiber is distanced from the first inner portion of the inner surface of the second guide hole.

8. The method according to claim 7, wherein the second insulation member is coupled to the first insulation member through a press forming process.

9. The method according to claim 7, wherein the first and second supporting members are spaced apart from each other and at least partly exposed to an external side of the first insulation member.

10. The method according to claim 7, further comprising forming a transmitter module such that the transmitter module is disposed opposite to the ends of the optical fiber exposed through the principal surface of the first insulation member and forming a receiving module such that the receiving module is disposed opposite to the ends of the optical fiber exposed through the principal surface of the first insulation member.

* * * * *